United States Patent [19]

Kautz

[11] 4,020,989
[45] May 3, 1977

[54] LIGHT TRANSMITTING BUILDING PANEL

[75] Inventor: Glenn E. Kautz, Sewickley, Pa.

[73] Assignee: H. H. Robertson Company, Pittsburgh, Pa.

[22] Filed: Oct. 20, 1975

[21] Appl. No.: 624,275

[52] U.S. Cl. .............................. 237/1 A; 126/270; 47/17; 98/31; 52/618; 165/166
[51] Int. Cl.² .......................................... F24J 3/02
[58] Field of Search .......... 237/1 A; 126/270, 271; 47/17; 98/31; 52/616, 618; 165/166

[56] References Cited

UNITED STATES PATENTS

| 1,131,437 | 3/1915 | Stockmann | 98/31 |
|---|---|---|---|
| 2,641,449 | 6/1953 | Antony | 52/303 |
| 2,680,565 | 6/1954 | Löf | 126/271 |
| 2,889,763 | 6/1959 | Pine | 98/31 |
| 3,028,872 | 4/1962 | Cresswell | 47/17 |
| 3,223,018 | 12/1965 | Tucker, Sr. | 98/31 |
| 3,847,211 | 11/1974 | Fischel et al. | 165/166 |
| 3,859,980 | 1/1975 | Crawford | 126/271 |
| 3,863,621 | 2/1975 | Schoenfelder | 126/270 |
| 3,897,820 | 8/1975 | Teeter, Jr. | 126/271 |
| 3,902,474 | 9/1975 | Pyle | 126/271 |
| 3,918,430 | 11/1975 | Stout et al. | 237/1 A |
| 3,943,994 | 3/1976 | Cleveland | 165/166 |

*Primary Examiner*—William F. O'Dea
*Assistant Examiner*—Henry C. Yuen
*Attorney, Agent, or Firm*—Harry B. Keck; George E. Manias

[57] ABSTRACT

A light transmitting building panel comprising a flat central sheet and upper and lower corrugated sheets secured to the opposite faces of the flat central sheet, thereby to provide a set of upper cells and a set of lower cells. The upper corrugated sheet is laterally offset relative to the lower corrugated sheet whereby each upper cell is positioned intermediate of adjacent ones of the lower cells and whereby heat conduction between the internal and external surfaces of the panel is minimized. The flat central sheet and the upper and lower corrugated sheets are formed from a light transmitting glass fiber reinforced plastic. The present building panel is particularly useful in greenhouses as roof panels and wall panels. The long span capability, the light transmitting characteristic and the unique cell arrangement of the present building panel are advantageously employed in greenhouses.

7 Claims, 14 Drawing Figures

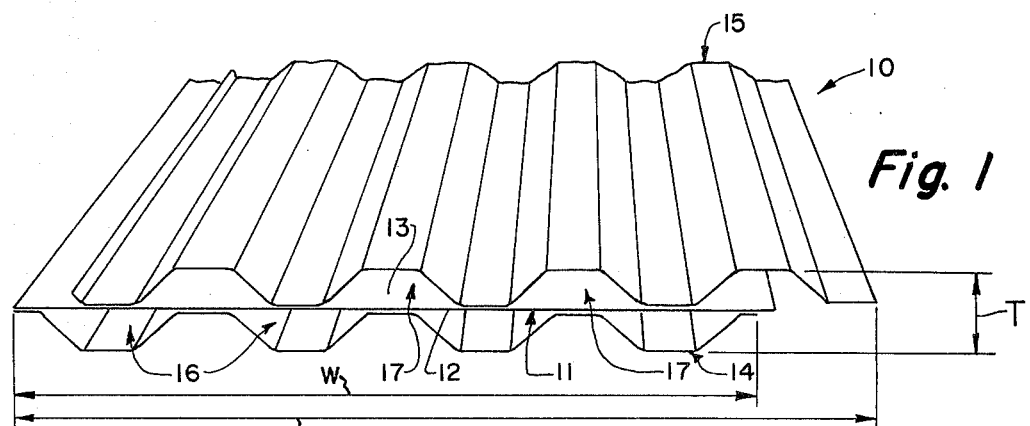
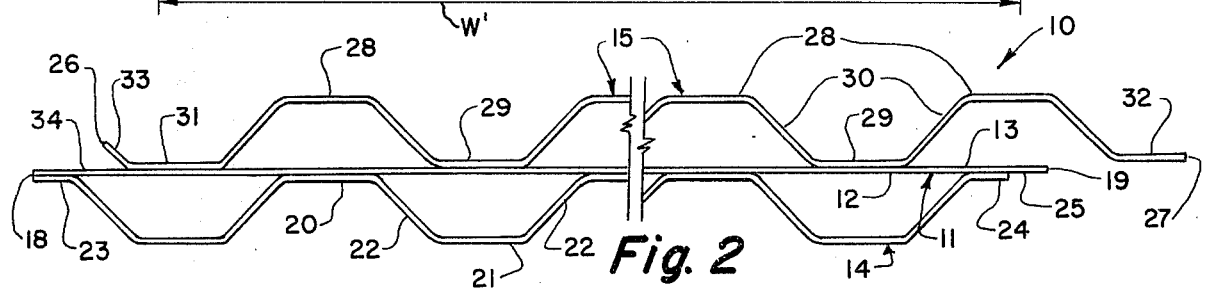
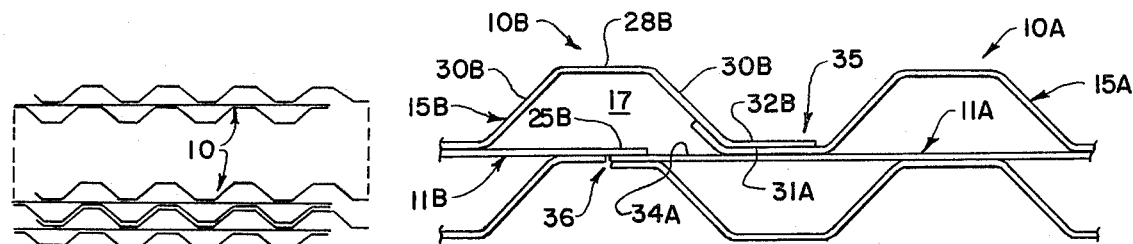
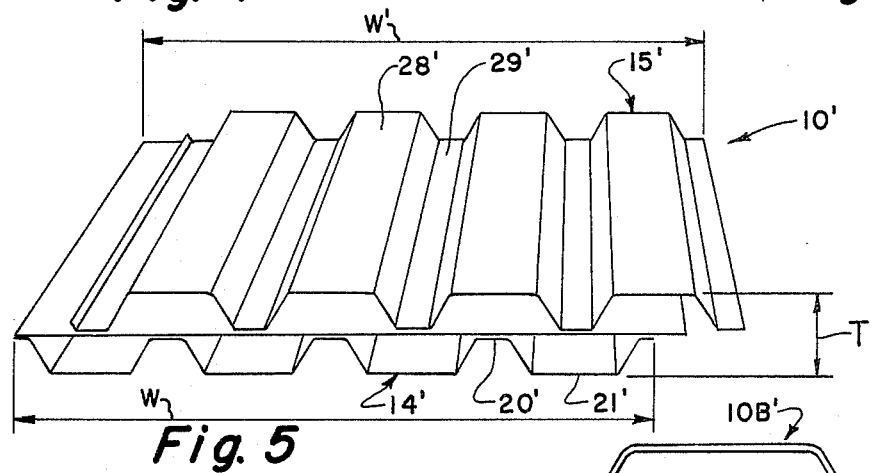
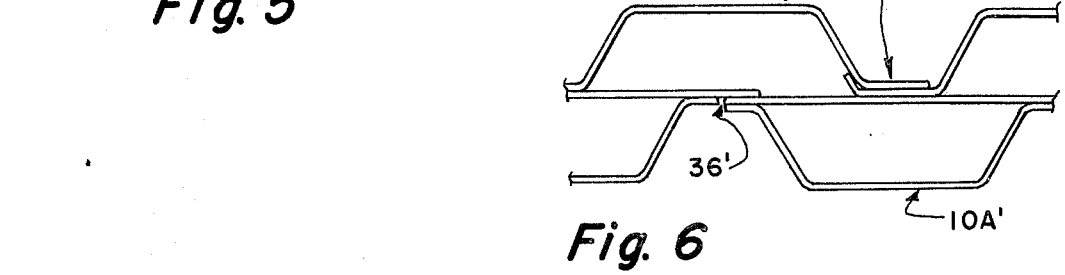
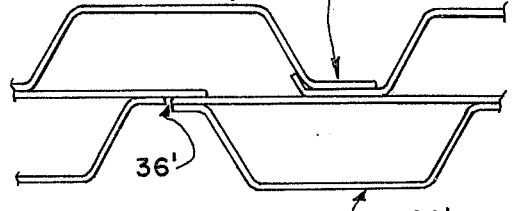

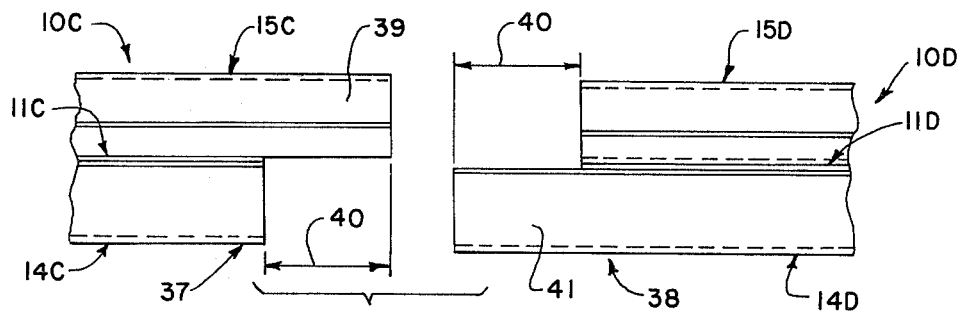
Fig. 7
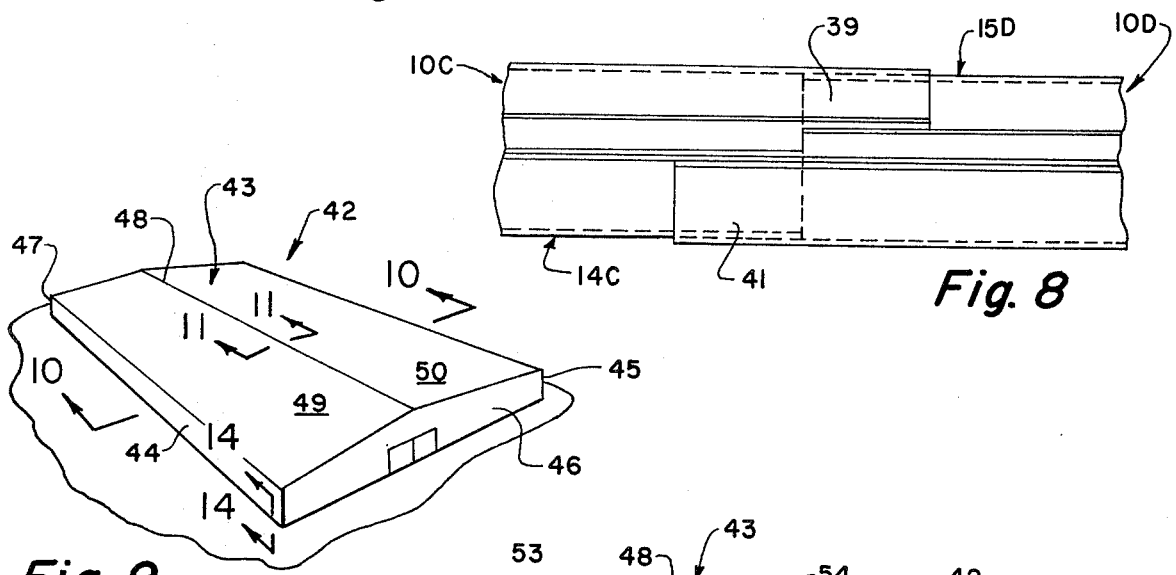
Fig. 8
Fig. 9
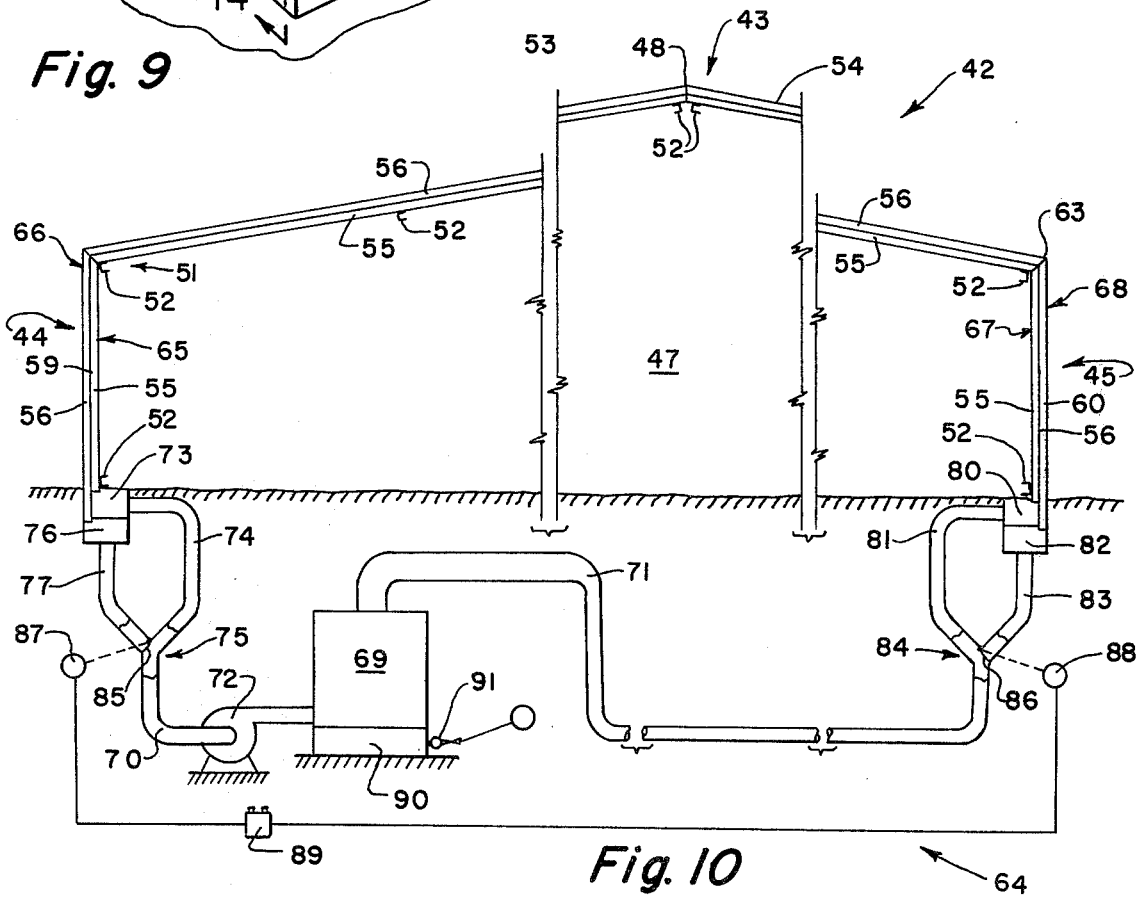
Fig. 10

LIGHT TRANSMITTING BUILDING PANEL

BACKGROUND OF THE INVENTION

1. Field of the Invention:

This invention relates to building panels, and more particularly to light transmitting building panels assembled from three sheets each formed from a light transmitting glass fiber reinforced plastic. 2. Description of the Prior Art:

Multi-layer roofing elements of plastic material are known in the art. See for example U.S. Pat. No. 3,282,012 (DU PRADAL). The DU PRADAL reference concerns roofing elements which utilize two or more corrugated elements arranged with the corrugations thereof parallel to each other and in crest-to-crest and valley-to-valley aligned relation.

Multi-layer panel elements which are microwave-transparent and have a uniform dielectric constant also are known in the art. See for example U.S. Pat. No. 3,432,859 (JORDAN). The JORDAN et al panels are useful in radomes and comprise a laminate of relatively thin sheets each having a minimal thickness of about 0.006 inches (0.15 mm) with a tolerance of about 0.0005 inches (0.013 mm) and wherein the corrugations do not exceed one-tenth of the radiation wave length to be used.

SUMMARY OF THE INVENTION

The principal object of this invention is to provide a light transmitting building panel assembled from three components all of which are formed from a light transmitting glass fiber reinforced plastic.

Another object of this invention is to provide a light transmitting building panel presenting upper and lower cells or passageways and having long span capabilities.

Still another object of this invention is to provide a light transmitting building panel wherein heat conduction between the internal and external surfaces of the panel is minimized.

A further object of this invention is to provide a greenhouse having a roof structure incorporating a plurality of the present light transmitting panels and having a gas recirculating system incorporating the outer and inner cells of the roof panels, whereby solar energy absorbed by air conveyed through the inner cells is accumulated in a heat reservoir; and whereby air heated in the heat reservoir is conveyed through the outer cells to melt snow accumulated on the roof.

The present invention provides a light transmitting building panel comprising, in general, a flat central sheet and upper and lower corrugated sheets confronting, respectively, the opposite faces of the flat central sheet. Each of the corrugated sheets is secured to the flat sheet along contiguous portions thereof. The corrugated sheets cooperate with the flat sheet to provide plural upper cells and plural lower cells. The upper corrugated sheet is laterally offset relative to the lower corrugated sheet such that each upper cell is presented intermediate of adjacent ones of the lower cells. The flat sheet and the upper and lower corrugated sheets are formed from a light transmitting glass fiber reinforced plastic, such as a light transmitting glass fiber reinforced polyester resin. The building panel has opposite longitudinal sides adapted for side-by-side overlap with adjacent ones of the building panel.

The present building panel is particularly useful in greenhouses where the long span capability, the light transmitting characteristic, and the unique cell arrangement thereof are advantageously employed. Such greenhouses have a roof structure and perimeter walls including opposite side walls and opposite end walls. In accordance with the present invention, the roof structure comprises a plurality of the present panels assembled in side-by-side overlapped relation. Further, in accordance with the present invention, the opposite side walls may each comprise a plurality of the present panels assembled in side-by-side overlapped relation and erected such that the outer cells thereof communicated with the outer cells of the roof panels and such that the inner cells thereof communicate with the inner cells of the roof panels. A gas recirculating system may be provided which incorporates the inner and outer cells of the roof panels and wall panels. The gas recirculating system incorporates suitable ducting, fan means for circulating air or other gaseous medium through the system, and a heat reservoir incorporating an auxiliary heater.

The greenhouse and associated gas recirculating system are particularly suited for northern climates. During sunny days, solar energy passing through the light transmitting roof panels is absorbed by air conveyed through the inner cells and is accumulated in the heat reservoir for use when needed. When snow accumulates on the roof structure, the snow is melted by heated air conveyed from the heat reservoir through the outer cells of the roof panels. The snow melting capability of the present roof panels eliminates the need of steep roof slopes. The present roof panels may be erected on a shallower-than-normal slope. It will also be appreciated that the solar energy accumulated in the heat reservoir may also provide internal heating of the greenhouse when required. Where the solar energy accumulated in the heat reservoir is insufficient for the snow melting process or for internal heating of the greenhouse, the auxiliary heater may be utilized.

BRIEF DESCRIPTION OF THE DRAWING(S)

FIG. 1 is a fragmentary perspective view of a light transmitting building panel of this invention;

FIG. 2 is a broken end view of the building panel of FIG. 1;

FIG. 3 is an end view of a pair of the building panels of FIG. 1 assembled in edge overlapped relation;

FIG. 4 is an end elevation view, schematically illustrating a plurality of the panels of FIG. 1 assembled in nested relation;

FIG. 5 is a view similar to FIG. 1, illustrating an alternative embodiment of the building panel of this invention;

FIG. 6 is an end view of a pair of the building panels of FIG. 3 assembled in edge overlapped relation;

FIG. 7 is a side view illustrating the adjacent ends of a pair of the panels of FIG. 1 or FIG. 5;

FIG. 8 is a side view illustrating the panels of FIG. 7 assembled in end overlapped relation;

FIG. 9 is an isometric view of a greenhouse incorporating the light transmitting building panel of this invention;

FIG. 10 is a cross-sectional view taken along the line 9—9 of FIG. 8, schematically illustrating a heating medium recirculating system;

Figure 12:
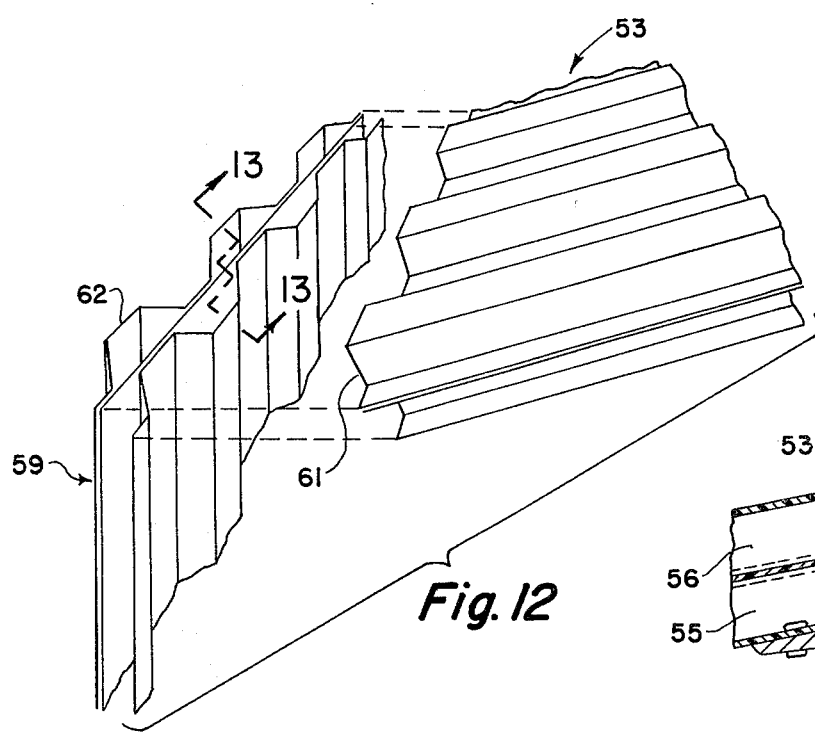
FIG. 12 is a fragmentary perspective view illustrating a roof panel and a side wall panel having matched mitered ends.

DESCRIPTION OF THE PREFERRED EMBODIMENT(S) the to the

FIG. 1 illustrates a light transmitting building panel 10 comprising, in general, a flat central sheet 11 having a first or lower face 12 and opposite thereto a second or upper face 13; and lower and upper corrugated sheets 14, 15 confronting, respectively, the first and second faces 12, 13 or te flat central sheet 11. The corrugated sheets 14, 15 are secured to the flat central sheet 11 along contiguous portions thereof and cooperate therewith to provide, respectively, a set of lower cells or passageways 16 and a set of upper cells or passageways 17. The upper corrugated sheet 15 is laterally offset relative to the lower corrugated sheet 15 and tothe flat central sheet 11 such that each upper cell 16 is presented intermediate of adjacent ones of the lower cells 17. The arrangement is such that heat conduction between the internal and external surfaces of the panel is inhibited.

Referring to FIG. 2, the flat central sheet 11 has first and second longitudinal edges 18, 19. The lower corrugated sheet 14 is presented intermediate of the edges 18, 19 and includes alternating crests 20 and valleys 21 and inclined webs 22 connecting adjacent ones of the crests 20 and the valleys 21. The lower corrugated sheet 14 also includes a first fragmentary crest 23 coterminating with the first longitudinal edge 18 and a second fragmentary crest 24 inwardly opposite from the second longitudinal edge 19. The flat central sheet 11 is provided with a lapping flange 25 extending laterally outwardly from the second lateral crest 24.

The upper corrugated sheet 15 is laterally offset relative to the flat central sheet 11 and has one longitudinal side 26 inwardly offset from the first longitudinal edge 18, and an opposite longitudinal side 27 presented beyond and laterally spaced-apart from the second longitudinal edge 19. The upper corrugated sheet 15 presents alternating crests 28 and valleys 29 and inclined webs 30 connecting adjacent ones of the crests 28 and valleys 29. The sheet 15 has first and second lateral valleys 31, 32 provided along the longitudinal sides 26, 27 thereof. The first lateral valley 31 adjoins an inclined flange segment 33. A side portion 34 of the flat central sheet 11 is presented laterally of the inclined web segment 33.

In the panel 10, the crests 20, 23 and 25 of the sheet 14 and the valleys 30, 31 and 32 of the sheet 15 are secured to the flat central sheet 11 by a light transmitting adhesive, for example, a clear silicone adhesive. In this manner, the light transmitting capability of the panel is substantially undiminished.

When adjacent panels 10A, 10B (FIG. 3) are assembled in side-by-side relation, two joints 35, 36 are provided. In the joint 35 the lateral flange 32B of the panel 10B overlaps the lateral valley 31A of the panel 10A. In the joint 36, the lapping flange 25B of the panel 10B overlaps the side surface portion 34A of the panel 10A. The lateral valley 32B and the flange 25B are secured to the valley 31A and the side surface portion 34A preferably by a light transmittting adhesive, such as a clear silicone adhesive. The crest 28B and the webs 30B of the upper corrugated sheet 15B cooperate with the flat central sheets 11A, 11B to provide an additional upper cell or passageway 17.

Reverting to FIG. 2, it will be observed that the lower and upper corrugated sheets 14, 15 have substantially identical profiles. The arrangement is such that the flat central sheet 11 coincides with the plane of neutral stress of the panel 10. It will also be observed in FIG. 2 that the crests 20, 28 and the valleys 21, 29 of the sheets 14, 15 have substantially identical widths, and that the webs 22, 30 are inclined at approximately 45 angular degrees. The arrangement is such that a plurality of the panels 10 may be readily nested, as shown in FIG. 4, for shipment and storage at the job site.

An alternative embodiment of the present light transmitting building panel is illustrated in FIG. 5 and designated generally by the numeral 10'. Corresponding primed numerals will be employed to identify corresponding parts heretofore described.

The lower corrugated sheet 14' presents crests 20' and valleys 21' — the width of the valleys 21' being greater than that of the crests 20'. The upper corrugated sheet 15' presents crests 28' and valleys 29' — the width of the crests 28' being greater than that of the valleys 29'. Thus the panel 10' differs from the panel 10 only in the profile of the lower and upper corrugated sheets, compare FIGS. 1 and 5. Adjacent panels 10A', 10B' (FIG. 5) may be assembled in side-by-side relation to provide the joints 35', 36' described above.

Where extremely long panels are required, the present panel 10 (10') may be adapted for installation in end overlapped relation. FIG. 6 illustrates end-aligned panels 10C, 10D having adjacent panel ends 37, 38, respectively. In the panel end 37, the upper corrugated sheet 15C has an end portion 39 extending beyond the ends of the flat central sheet 11C and the lower corrugated sheet 14C by a distance indicated at 40. In the panel end 38, the lower corrugated sheet 14B has an end portion 41 extending beyond the ends of the flat central sheet 11D and the upper corrugated sheet 15D by substantially the same difference 40. FIG. 8 illustrates the panels 10C, 10D disposed in end overlapped relation. The lapping end portions 39, 41 are secured to the upper and lower corrugated sheets 15D, 14C, respectively, preferably by a light transmittting adhesive, such as a clear silicone adhesive.

The sheets 11, 14, and 15 preferably are formed from a light transmitting glass fiber reinforced plastic for example, a glass fiber reinforced polyester resin.

In a typical panel 10 (or 10'), the upper corrugated sheet 15 may have a thickness of 0.028 inches (0.71 mm) and weigh 4 ounces/square foot (1221 gm/M$^2$); the flat central sheet may have a thickness of 0.032 inches (0.81 mm) and weigh 4 ounces/square foot (1221 gm/M$^2$); and the lower corrugated sheet 14 may have a thickness of 0.042 inches (1.07 mm) and weigh 6 ounces/square foot; (1831 gm/M$^2$). The panel 10 (or 10') may have an overall width W' (FIGS. 1 and 5) of approximately 32 inches and provide a coverage width W of approximately 28 inches. The panel 10 (or 10') may be provided in lengths up to 40 feet (12.2 M). The present panel 10 (or 10') is capable of spanning in excess of 10 feet (3.05 M).

Figure 11:
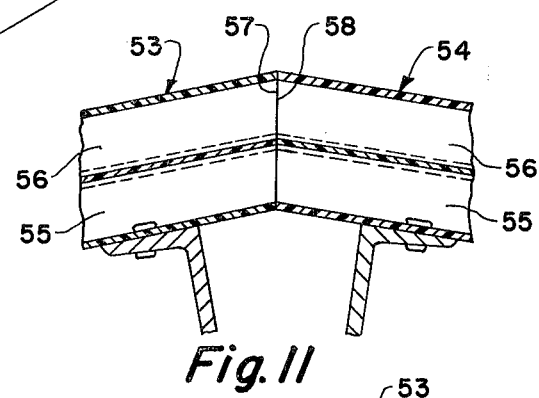
FIG. 11 is a cross-sectional view taken along the line 11—11 of FIG. 9.

The present building panel is particularly useful in greenhouses where the long span capability, the light transmitting characteristic, and the unique cell arrangement of the present building panel are advantageously employed. FIG. 9 illustrates a greenhouse 42 having a roof structure 43 and perimeter walls including opposite side walls 44, 45, and opposite end walls 46, 47. The roof structure 43, in this illustration, is a double-pitched roof including a ridge 48 and sloped roof sections 49, 50. As schematically illustrated in FIG. 10, the roof structure 43 and the perimeter walls 44 to 47 are supported on the structural framework 51 of which only horizontal frame members 52 are shown. communicate, respectivvely, In accordance with the present invention, the roof sections 49, 50 comprise a plurality of roof panels 53, 54, respectively, comprising either of the panels 10 or 10′ — assembled in the side-by-side overlapped relation illustrated in FIGS. 3 and 6. The roof panels 53, 54 include inner cells 55 presented interiorly of the greenhouse 42, and outer cells 56 presented exteriorly of the greenhouse 42. The roof panels 53, 54 (FIG. 11) are provided with mitered ends 57, 58 and are secured together in cell-aligned relation such that the cells 55, 56 of the roof panels 53 communicate, respectively, with the cells 55, 56 of the roof panels 54.

Figure 13:
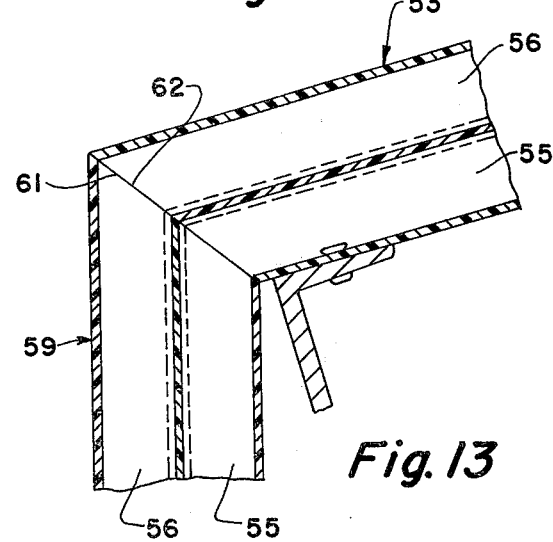
FIG. 13 is a cross-sectional view taken along the line 13—13 of FIG. 12 illustrating the roof panel connected to the side wall panel.

Further in accordance with this invention, the side walls 44, 45 comprise, respectively, a plurality of wall panels 59, 60 — comprising either of the panels 10 or 10′ — assembled in the side-by-side overlapped relation illustrated in FIGS. 3 or 6. The wall panels 59, 60 include inner cells 55 presented interiorly of the greenhouse 42 and outer cells 56 presented exteriorly of the greenhouse 42. The roof panels 53 and the wall panels 59 (FIG. 12) are provided with mitered ends 61, 62 and are secured together (FIG. 13) in cell-aligned relation such that the cells 55, 56 of the roof panels 53 communicate, respectively, with the cells 55, 56 of the wall panels 59. The adjacent ends of the roof panels 54 and wall panels 60 are similarly mitered as at 63 (FIG. 10) and secured together such that the cells 55, 56 of the roof panels 54 communicate, respectively, with the cells 55, 56 of the wall panel 60.

The greenhouse 42 is provided with a gas recirculating system 64 schematically illustrated in FIG. 10, by which air or other gaseous medium is conveyed through the cells 55 or 56 for purposes to be described later. In general, the system 64 includes first and second outlet duct means 65, 66 along one side of the greenhouse 42; first and second inlet duct means 67, 68 along the opposite side of the greenhouse 42; and a heat reservoir 69 having a reservoir inlet duct 70 communicating with the first and second outlet duct means 65, 66 and a reservoir outlet duct 71 communicating with the first and second inlet duct means 67, 68. Fan means 72 is provided in the reservoir inlet duct 74 recirculating air through the system 64.

The first outlet duct means 65 incorporates the inner cells 55 of the panels 59. The inner cells 55 communicate with the first outlet manifold 73 which extends the full length of the side wall 44. Air is conveyed from the first outlet mainfold 73 through a first outlet branch duct 74 to a first two-way valve means 75 incorporated into the reservoir inlet duct 70.

Figure 14:
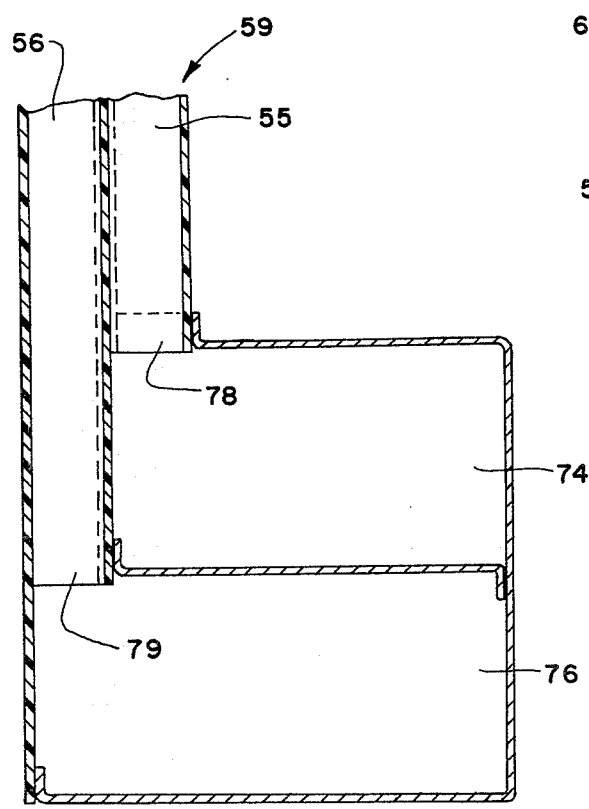
FIG. 14 is a cross-sectional view taken along the line 14—14 of FIG. 9 illustrating a manifold arrangement for the cells of the side wall panels.

The second outlet duct means 66 incorporates the outer cells 56 of the panels 59. The cells 56 communicate with the second outlet manifold 76 from which air is conveyed through a second outlet branch duct 77 to the first two-way valve means 75. As best illustrated in FIG. 14, the inner and outer cells 55, 56 have open ends 78, 79 communicating with the first and second outlet manifold 74, 76.

Reverting to FIG. 10, the first inlet duct means 67 incorporates the inner cells 55 of the wall panel 60. The inner cells 55 communicate at their lower ends, with a first inlet manifold 80 which receives air from a first inlet branch duct 81.

The second inlet duct means 68 incorporates the outer cells 56 of the wall panel 60. The outer cells 56 communicate, at their lower ends, with the second inlet manifold 82 which, in turn, communicates with a second inlet branch duct 83. A second two-way valve means 84 connects the reservoir outlet duct 71 to each of the first and second inlet branch ducts 81, 83.

The system 64 has two separate modes of operation. In the first mode, air is conveyed through the inner cells 55 of the roof panels 53, 54 and the wall panels 44, 45. In the second mode, air is conveyed through the outer cells 56 of the roof panels 53, 54 and the wall panels 44, 45. To facilitate the two modes of operation, the valve means 75 (84) incorporates the damper 85 (86) moveable between a first position wherein the branch duct 77 (83) is sealed off during first mode operation and a second position wherein the branch duct 74 (81) is sealed off during second mode of operation. The first and second valve means 75, 84 are provided with valve operators 87, 88, respectively, for switching the valve 75, 84 between the first and second positions. A common valve actuator 89 is operatively connected to the valve operators 87, 88 for switching the dampers 85, 86 from the first position to the second position and vice versa.

The present greenhouse 42 and associated gas recirculating system 64 are particularly suited for northern climates wherein snowfalls are encountered. During sunny days, the system 64 is switched to the first mode operation wherein solar energy passing through the light transmitting roof panels 53, 54 and wall panels 44 (or 45) is absorbed by the air conveyed through the inner cells 55 and is accumulated in the heat reservoir 69 for use when needed. Should a snowfall occur, the system 64 may be witched to the second mode operation wherein heated air is conveyed from the heat reservoir through the outer cells 56 — the heat thereof being used to melt the accumulated snow on the roof structure 43. The snow melting capability of the present panels eliminates the requirement of steep roof slopes. The present roof panels may be erected on a slope as shallow as 2 inches in 12 inches (16.7 millimeters in 1 meter).

It will be observed in FIG. 10 that the heat reservoir 69 is provided with heating means 90 which may incorporate, for example, gas-fired burners 91. Where the solar energy accumulated in the heat reservoir 69 is insufficient to melt snow deposited on the roof structure 43, the heating means 90 may be activated to accomplish the necessary snow melting process.

It will also be appreciated that during the night when temperatures may fall below that conducive to plant growth, the system 64 may remain in the first mode operation during which adcumulated energy from the heat reservoir may be conveyed by the air through the inner cells 55 to provide internal heating of the greenhouse 42. Again, where the accumulated solar energy is insufficient to accomplish the required internal heating, the heating means 90 may be utilized.

I claim:

1. In a greenhouse having a structural framework, opposite side walls and opposite end walls erected on said framework, and a roof structure spanning between said opposite side walls and supported on said framework; the combination including:

said roof structure comprising a plurality of edge overlapped panels spanning between said opposite side walls and each comprising, a flat central sheet having a first face and opposite thereto a second face, lower and upper corrugated sheets confronting, respectively, said first face and said second face of said flat central sheet and each being secured to said flat central sheet along contiguous portions thereof, said lower and upper corrugated sheets cooperating with said flat sheet to provide, respectively, a set of inner cells presented interiorly of said greenhouse and a set of outer cells presented exteriorly of said greenhouse, the upper corrugated sheet being laterally offset relatively to the lower corrugated sheet such that each outer cell is presented intermediate of adjacent inner cells, and said flat central sheet and lower upper corrugated sheets each being formed from light transmitting glass fiber reinforced plastic; and a gas recirculating system comprising:

a heat reservoir having a reservoir inlet conduit and a reservoir outlet conduit;

outlet duct means exending between and communicating with the cells of one said set at one end of the panels of said roof structure and with said reservoir inlet conduit;

inlet duct means extending between and communicating with said reservoir outlet conduit and with the cells of said one said set at the opposite end of the panels of said roof structure; and fan means for recirculating gas through said system and the cells of said one said set.

2. The greenhouse defined in claim 1 wherein said one said set comprises said set of inner cells.

3. The greenhouse as defined in claim 1 wherein said one said set comprises said set of outer cells.

4. The greenhouse as defined in claim 1 wherein said heat reservoir includes auxiliary heating means.

5. The greenhouse as defined in claim 1 wherein
each of said side walls comprises additional ones of said edge overlapped panels erected vertically and each presenting a set of outer cells and a set of inner cells communicating, respectively, with the set of outer cells and the set of inner cells of the panels of said roof structure; and said outlet duct means and said inlet duct means including those cells of the panels of said side walls which communicate with said one said set.

6. The greenhouse as defined in claim 1 including:
second outlet duct means extending between and communicating with the cells of the other said set at said one end of said panels of said roof structure;

second inlet duct means extending between and communicating with the cells of the other said set at said other end of said panels of said roof structure;

first valve means for establishing communication alternately between (a) the first said outlet duct means and said reservoir inlet conduit, and (b) said second outlet duct means and said reservoir inlet conduit; and second valve means establishing communication between (a) said reservoir outlet conduit and the first said inlet duct means when said reservoir inlet coduit communicates with the first said outlet duct means, And (b) said reservoir outlet conduit and said second inlet duct means when said reservoir inlet conduit communicates with said second outlet duct means.

7. The greenhouse as defined in claim 6 wherein each of said opposite side walls comprises additional ones of said edge overlapped panels erected vertically and each presenting a set of outer cells and a set of inner cells communicating, respectively, with the set of outer cells and the set of inner cells of the panels of said roof structure;

the first said outlet duct means and the first said inlet duct means including the inner cells of the panels of said opposite side walls; and said second outlet duct means and said second inlet duct means including the outer cells of the panels of said opposite side walls.

* * * * *